June 19, 1962 D. C. SATHER 3,040,316
LIMITING CIRCUIT FOR AN AIRCRAFT CONTROL SYSTEM
Filed June 22, 1959 2 Sheets-Sheet 2

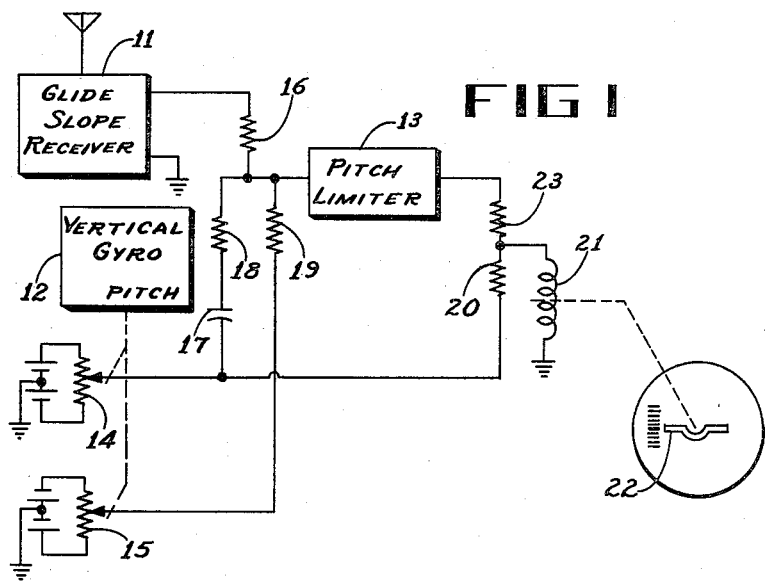
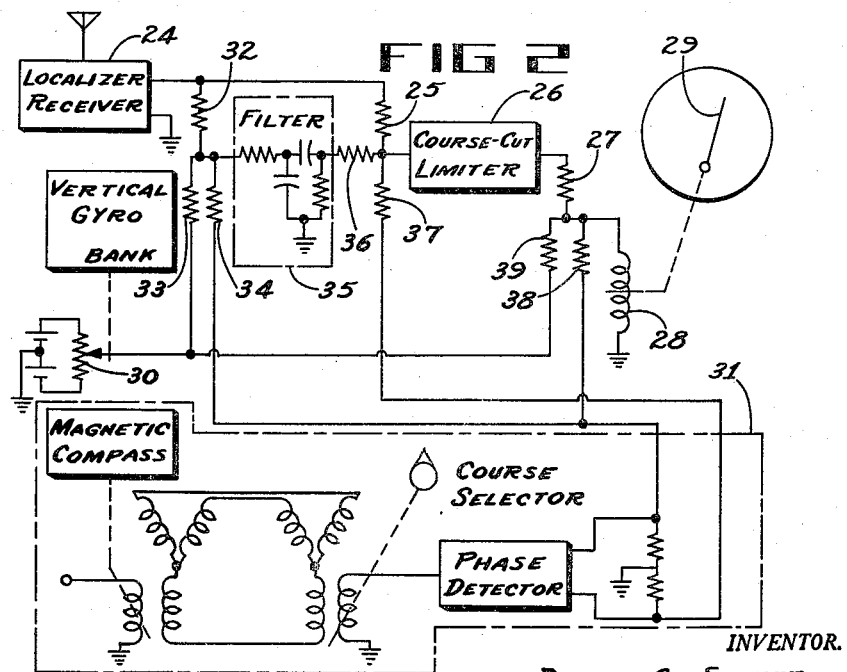

INVENTOR.
DELAINE C. SATHER
BY
ATTORNEY
AGENT

United States Patent Office 3,040,316
Patented June 19, 1962

3,040,316
LIMITING CIRCUIT FOR AN AIRCRAFT
CONTROL SYSTEM
Delaine C. Sather, Cedar Rapids, Iowa
Filed June 22, 1959, Ser. No. 821,976
6 Claims. (Cl. 343—108)

This invention relates to control circuits for aiding in the guidance of aircraft and particularly pertains to balancing and limiting circuits for limiting certain navigational signals and, only after the signals are strong enough to be limited, combining still other navigational signals to the limited signals.

In navigational systems for aircraft, signals that are received from devices for sensing the attitude, motion, or position of aircraft are applied to circuits for developing command control signals. These control signals either operate indicators to aid pilots in manually controlling aircraft to fly desired courses or are effective in operating automatic pilot systems that automatically guide aircraft to desired destinations. When either manual or automatic piloting is employed, a change of heading or an interception of a guidance radio beam by an aircraft may cause its sensors to indicate that a greater change in direction of flight is required than can be effected abruptly with discomfort to passengers, or damaging stress to the structure of the aircraft, or overshooting of a desired path.

Excessive acceleration while positioning aircraft in new attitudes or in new flight paths may be prevented by inserting limiters between the sensing devices and the positioning or guidance means that determine the attitudes of the aircraft. A source of first signal voltage, for example, the output of a glide-slope receiver, may be connected to the input of a limiter. For receiver outputs less than a predetermined maximum unlimited voltage, the amplitude of the output voltage of the limiter changes linearly with the output of the receiver and indicates the extent of the vertical departure of an aircraft from a glide-slope path. When the output of the receiver exceeds the predetermined maximum voltage, the voltage at the output of the limiter is limited to a particular value which corresponds to a position much closer to the glide-slope path than the actual position of the aircraft.

A second voltage, for example, that is indicative of the pitch of the aircraft, is subtracted from the output of the limiter to provide a command voltage which determines the actual display on the visual indicator. In former systems, the pitch voltage is subtracted from the receiver voltage at all times regardless of whether or not the receiver output voltage exceeds the predetermined maximum unlimited voltage. In such systems the second voltage is applied directly to the output of the limiter.

In the systems described herein, signal voltage for application to the input of the limiter may be obtained from one or more sensors for supplying certain navigational information, and the output of the limiter may be connected to a source of voltage corresponding to different navigational information. The instant systems differ from former systems in that the voltage from the latter source is subtracted from that voltage which is applied to the input of the limiter only when the input voltage exceeds a predetermined maximum voltage at which the limiter becomes effective for maintaining its output voltage substantially constant. The systems described herein are particularly applicable when one of the input signal voltage circuits is "high-passed," the circuit being high-passed to prevent steady state voltage of relatively long duration from affecting the output indication.

Accordingly, the aircraft navigational system of this invention comprises a limiter, a first source of navigational voltage connected to the input of said limiter, a second source of navigational voltage connected to the output of said limiter, and a source of balancing voltage that varies in magnitude with the voltage of said second source and connected to said limiter for neutralizing the effect of the voltage of said second source only when the input voltage applied to said limiter is less than the maximum voltage that can be passed through said limiter.

An object of this invention is to provide control circuits responsive to certain navigational signals for changing the motion of an aircraft until the signals exceed a maximum allowable limit corresponding to a predetermined flight parameter, and responsive to other navigational signals to further limit the motion of the aircraft only after the certain signals exceed the allowable limit.

Another object of this invention is to provide in navigational systems a limiter for limiting a certain control voltage in response to the amplitude becoming greater than a predetermined amplitude and for combining the resulting limited voltage with an additional control voltage only when the input voltage is greater than the predetermined amplitude.

The following description and appended claims may be more readily understood with reference to the accompanying drawings, in which:

FIGURE 1 is a partial block and partial schematic diagram of the limiter of this invention connected to a glide-slope receiver and a vertical gyroscope;

FIGURE 2 is a combination block and schematic diagram of a limiter connected to a localizer receiver, a vertical gyroscope, and a magnetic compass;

Figure 3:
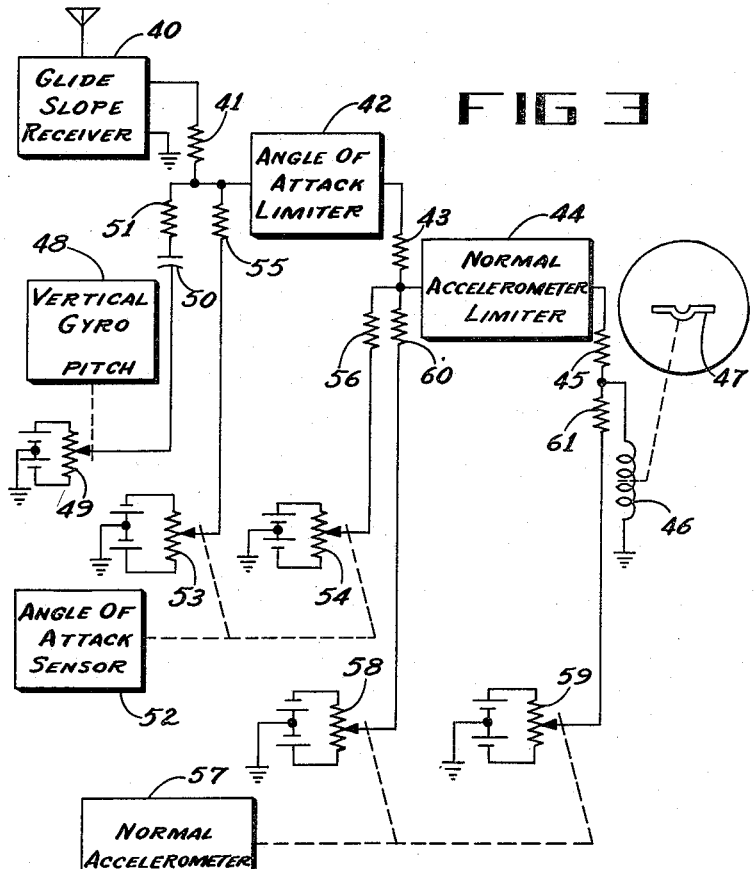
FIGURE 3 shows in block and schematic form two limiters connected in cascade in a circuit for applying the outputs of a glide-slope receiver, the vertical gyro, an angle-of-attack sensor, and a normal accelerometer to indicator circuits.

The application of a limiter to circuits for controlling the vertical guidance of an aircraft along a glide-slope path is shown in FIGURE 1. The output voltage of a glide-slope receiver and the high-passed voltage (voltage passed through a high-pass filter) of the pitch sensor of a vertical gyroscope are combined in a resistive network for application to a limiter. Pitch voltage is applied directly from the gyroscope to the output of the limiter to be subtracted from that voltage which is applied to the input of the limiter. The difference voltage in the output of the limiter is effective in positioning an indicator. Positioning of the aircraft control surfaces for producing a zero reading on the indicator ensures that the aircraft will gradually approach the glide-slope path asymptotically without accelerating the aircraft to uncomfortable or dangerous limits.

In more detail, the output of glide-slope receiver 11 and that output of vertical gyroscope 12 which indicates the pitch of the aircraft are applied through a resistive network to the input of pitch limiter 13. The output of the glide-slope receiver is applied through resistor 16 of the network, and the output of vertical gyroscope 12 as derived from potentiometer 14 is applied through capacitor 17 of a high-pass filter and series resistor 18. An additional voltage corresponding to the pitch of the aircraft is derived from potentiometer 15. Potentiometers 14 and 15 are ganged and operated from vertical gyroscope 12 such that the output voltages from the potentiometers have equal absolute values but opposite polarities. The output voltage from potentiometer 14, in addition to being applied through the high-pass filter to the input of limiter 13, is applied through resistor 20 to the operating winding 21 which controls the position of horizontal steering bar 22. The output of pitch limiter 13 is applied through resistor 23 to the operating winding 21. The voltage that is applied from potentiometer 14 through resistor 20 is not effective in changing the operation of horizontal steering bar 22 unless the pitch limiter 13 is actually effective in limiting the input voltage, because voltage opposite in polarity to that which is applied through resistor 20 is applied through resistor 19 to the input of pitch limiter 13.

A control system according to FIGURE 1 operates to aid pilots in guiding aircraft vertically for entering asymptotically an inclined glide-slope path that is defined by a beam of radiant energy transmitted from the location of the runway. When the aircraft is flying slightly below the glide-slope beam, negative output voltage from glide-slope receiver 11 is applied through resistor 16 and pitch limiter 13 for positioning the horizontal steering bar 22 below its zero position. The pilot in response to observing the position of the horizontal steering bar operates the aircraft controls for pitching the aircraft upward. In response to the change in pitch of the aircraft, potentiometer 14 of the vertical gyroscope 12 develops a positive voltage which is initially applied to the input of limiter 13 in opposition to the voltages applied by glide-slope receiver 11. Potentiometer 15 develops a negative voltage which is applied through resistor 19 to neutralize voltage that is applied to the indicator from potentiometer 14 through resistor 20.

For simplicity, the voltages from the different sensors are described as being applied individually to the limiter circuits. Obviously the voltages are added algebraically in the resistive networks for applying to the limiting circuits voltages that are intermediate or mean to the separate control voltages. The value of each balancing resistor in the circuits described herein is chosen to neutralize the effect of a corresponding voltage of opposite polarity in the output of a limiter.

Since the output of the glide-slope receiver for slight departures from the glide-slope path has less amplitude than the maximum voltage that can be passed by limiter 13, the voltages applied through resistors 19 and 20 exactly balance and have no effect upon the positioning of horizontal steering bar 22. As the aircraft is controlled for entering the glide-slope beam gradually for preventing oscillation of the aircraft about the glide-slope beam, the high-pass pitch voltage that is applied from potentiometer 14 through capacitor 17 and resistor 18 to the input of pitch limiter 13 is equal but opposite in polarity to the voltage that is applied to the input of pitch limiter 13 from the glide-slope receiver through resistor 16.

When the aircraft is flying quite far below the glide-slope beam, for example, when the angle between the glide-slope beam and that radial which is drawn between the runway and the position of the aircraft is greater than one-half degree, the output of the glide-slope receiver is higher than that voltage which can be passed without limiting through pitch limiter 13. The voltages developed by potentiometers 14 and 15 in response to the change in the pitch of the aircraft and applied through resistors 18 and 19 are in opposition so that the negative voltage applied from glide-slope receiver 11 through resistor 16 is still greater than the maximum unlimited value. In order to obtain zero reading of the horizontal steering bar 22, the required upward pitch must be only great enough to apply sufficient voltage through resistor 20 for canceling the limited voltage that is applied through resistor 23 to the operating winding 21 of the horizontal steering bar. Therefore, the pitch of the aircraft is limited to that required for potentiometer 14 to develop voltage sufficient for canceling the maximum predetermined output of the limiter. When the aircraft is flying above the glide-slope beam, the operation is similar except that the polarities of the output voltages of the glide-slope receiver and of the pitch-sensing potentiometers 14 and 15 are reversed.

A system for aiding in the lateral guidance of an aircraft for following a localizer beam to a desired runway is shown in FIGURE 2. The output of a localizer receiver is applied through a course-cut limiter to the operating circuits of a vertical steering pointer. When the aircraft is positioned sufficiently far laterally from the beam, voltage which is proportional to the deviation of the heading of the aircraft from the direction of the approach to the runway is subtracted from the voltage derived from the localizer receiver. Required damping voltages or rate signals having proper polarity for negative feedback are derived from the combined output of a localizer receiver, the bank sensor of a vertical gyroscope, and also the output of the course-directional sensor which provides voltage corresponding to the direction of the runway.

The output of localizer receiver 24 is applied through resistor 25, course-cut limiter 26, and resistor 27 to the operating winding 28 of the vertical steering pointer 29. In order to develop effective damping or rate feedback voltages, the output voltage of the localizer receiver is combined in a resistive network with the bank voltage from the vertical gyroscope and the output voltage from the course-directional system. The output of the localizer receiver is applied through resistor 32 to the input of complementary filter 35; the bank voltage from potentiometer 30 of the vertical gyroscope is applied through resistor 33; and the output of course-directional circuits 31 are applied through resistor 34 to the input of the complementary filter. The bank voltage and the course voltage, which are developed in response to the pilot's changing the course of the aircraft for entering the localizer beam, are opposite in polarity to that voltage applied to the filter from the localizer receiver.

The complementary filter 35 namely functions as a differentiator and low-pass filter for the voltage derived from the localizer receiver and functions as a high-pass filter for the voltage derived from the course-directional system 31 and also for the voltage derived from the bank circuits 30 of the vertical gyroscope. The complementary filter is actually a band-pass filter having a special function. The output of the complementary filter as derived from the combination of these three voltages provide a feedback rate signal having desirable control characteristics as described in United States Patent No. 2,548,278 issued to W. H. Wirkler on April 10, 1951.

In addition to being applied to the input of the complementary filter, the output of the bank sensing circuit 30 of the vertical gyroscope is applied through resistor 39 directly to the operating winding 28 of vertical steering pointer 29. This voltage is of proper polarity to oppose the voltage developed by localizer receiver 24 and during change of course of aircraft is always subtracted from the output of the localizer receiver regardless of the limiting action of course-cut limiter 26. In response to the aircraft having a heading for entering the localizer beam, voltage having the same polarity as that developed in the output of localizer receiver 24 is applied through resistor 37 to the input of course-cut limiter 26, and voltage having the opposite polarity is applied through resistor 38 to the output circuit of the course-cut limiter that is connected to the operating winding 28. These voltages from the course-directional system being of opposite polarities are of proper magnitude to neutralize each other when the voltage that is applied to course-cut limiter 26 from localizer receiver 24 is less than the predetermined maximum unlimited voltage.

When only slight correction of the aircraft heading is required in order to cause the aircraft to enter the localizer beam, voltage applied through resistor 25 to course-cut limiter 26 is below the predetermined maximum voltage so that substantially the full voltage is applied through resistor 27 to the operating winding 28 of the vertical steering pointer 29. In response to the pilot's changing the course of the aircraft, output voltage from the bank circuit 30 of the vertical gyroscope and output voltage from the course-directional circuits 31 are combined with the output of the localizer receiver for application to the complementary filter 35 for developing a simulated rate feedback voltage to provide gradual entry of the aircraft into the localizer beam. Also, voltage that is applied from the bank sensor through resistor 39 is subtracted from the output of the course-cut limiter for ensuring a gradual lateral approach to the localizer beam. The voltages applied from the course-directional circuit 31 through resistors 37 and 38 have equal and opposite effects and, therefore, while the limiter is not effective in limiting, produce no change in position of the vertical steering pointer 29.

When considerable change in the course of the aircraft is required for entering a localizer beam, the voltage developed by the localizer receiver exceeds the predetermined maximum unlimited voltage of course-cut limiter 26 so that the voltage applied through resistor 37 from course-directional circuits 31 is limited and does not neutralize the voltage of opposite polarity that is applied from the same circuits through resistor 38. The voltage applied through resistor 38 is therefore subtracted from the output of the course-cut limiter so that the vertical steering pointer 29 indicates zero for a heading of the aircraft which has a predetermined maximum angle with respect to the direction of the approach of the runway.

The circuit of FIGURE 3 is a modification of the circuit of FIGURE 1 and provides somewhat closer control of the vertical entry to the glide-slope path to ensure that the aircraft will not stall or that it will not be accelerated excessively in the vertical direction for causing discomfort to passengers aboard the aircraft. Rather than limiting the pitch of the aircraft by voltage derived from a vertical gyroscope, the angle of attack and acceleration are limited by voltage derived from an angle-of-attack sensor and voltage derived from a normal accelerometer. Although the angle of attack is a function of pitch, it is a better indication than pitch for determining the stalling point of an aircraft because it is also a function of the loading and the forward velocity of the aircraft.

The output of glide-slope receiver 40 is applied to a horizontal steering bar indicator through a serially connected angle-of-attack limiter and a normal-accelerometer limiter. When the output of glide-slope receiver 40 is low, the limiters have no effect on changing the position of the horizontal steering bar. When the voltage applied to the input of the angle-of-attack limiter exceeds its maximum unlimited voltage, voltage derived from the angle-of-attack sensor is subtracted from the error voltage derived from the glide-slope receiver; and likewise, when the output of the angle-of-attack limiter in combination with the output of the angle-of-attack sensor exceeds the predetermined maximum unlimited voltage of the normal-accelerometer limiter, voltage derived from the normal accelerometer is subtracted from the error voltage in order to limit the amount of correction in pitch of the aircraft for positioning the horizontal steering bar on zero.

The glide-slope receiver 40 is connected through resistor 41, angle-of-attack limiter 42, resistor 43, normal-accelerometer limiter 44, and resistor 45 to the operating winding 46 of horizontal steering bar indicator 47. In response to the change in pitch of the aircraft, high-passed pitch, as described for FIGURE 1, from potentiometer 49 of vertical gyroscope 48 is applied through capacitor 50 and resistor 51 to the input of angle-of-attack limiter 42. This voltage is of proper polarity to oppose the output voltage from glide-slope receiver 40 so as to limit the change in pitch required for maintaining the horizontal steering bar 47 in its zero position. An angle-of-attack sensor 52 controls potentiometer 53 for applying a voltage through resistor 55 to the input of angle-of-attack limiter 42 and simultaneously operates potentiometer 54 for applying voltage of opposite polarity through resistor 56 to the output of angle-of-attack limiter 42. When the angle of attack is such that the aircraft is entering the glide-slope beam, the voltage applied through resistor 55 at the input of the angle-of-attack limiter has the same polarity as the output voltage of glide-slope receiver 40 and obviously the output voltage of the angle-of-attack sensor applied through resistor 56 to be combined with the output of the angle-of-attack limiter is opposite in polarity from that developed in the output of glide-slope receiver 40.

The normal accelerometer 57 controls potentiometer 58 for applying voltage through resistor 60 to the input of normal-accelerometer limiter 44 and controls potentiometer 59 for applying voltage through resistor 61 to the output of the accelerometer limiter which is connected to the operating winding 46 of the horizontal steering bar indicator 47. When the aircraft is being accelerated vertically in the direction for entering the glide-slope beam, the voltage that is applied through resistor 60 to the input of the normal-accelerometer limiter is the same as the polarity of the voltage of the glide-slope receiver 40 and the polarity of the voltage applied through resistor 61 is opposite to that of the output of the glide-slope receiver.

When the departure from the beam is sufficient for requiring considerable change in the course of the aircraft, the aiding combined voltages applied to the angle-of-attack limiter from the glide-slope receiver and the angle-of-attack sensor exceed that voltage which is applied from the pitch circuit of the vertical gyroscope 48 to the extent that the difference voltage is greater than the maximum unlimited voltage of the angle-of-attack limiter. While the angle-of-attack limiter is effective in limiting, the voltage developed by the angle-of-attack sensor and applied through resistor 56 is subtracted from the limited voltage that is applied from the angle-of-attack limiter through resistor 43 such as to limit the change in angle of attack that is required for maintaining the horizontal steering bar 47 on a zero. The operation of the angle-of-attack limiter in cooperation with the angle-of-attack sensor limits the angle of attack and prevents a stalling attitude that might be readily attained when the aircraft is flying upward to enter a glide-slope beam.

Likewise, when the input voltage to the normal-accelerometer limiter 44 exceeds the predetermined maximum unlimited voltage, the voltage developed by the normal accelerometer 57 for application through resistor 61 to the operating winding 46 of the horizontal steering bar is subtracted from the output voltage of the normal-accelerometer limiter that is applied through resistor 45. The horizontal steering bar 47 is therefore maintained on zero without the aircraft attaining an unsafe or uncomfortable rate of acceleration.

Ordinarily, except momentarily, in very unusual circumstances, the angle-of-attack limiter will not limit simultaneously with the normal-accelerometer limiter. Obviously, if the aircraft is flying such that the angle of attack is at a maximum and the forward velocity of the aircraft is relatively constant, the acceleration of the aircraft will approach zero quickly.

Figure 4:
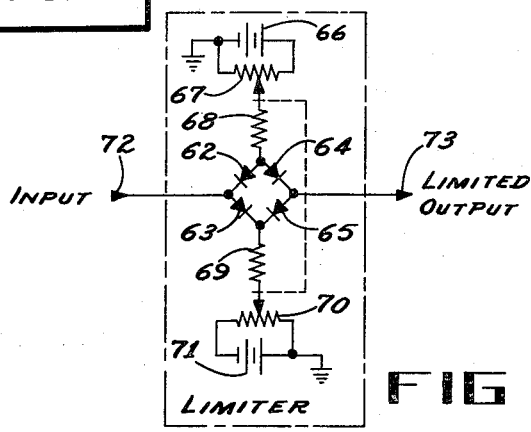
FIGURE 4 is a schematic diagram of one type of limiter that may be substituted for the limiters shown in block form in FIGURES 1, 2, and 3.

Limiters of the type shown in FIGURE 4 may be substituted for the blocks designated as limiters shown in FIGURES 1, 2, and 3. The limiter comprises a diode bridge circuit connected in a biasing circuit that is balanced relative to ground. The bridge circuit comprises diodes 62–65 that are normally conductive. Current normally flows from direct-current source 66, through potentiometer 67, series-isolating resistor 68, the four diodes 62–65 in the bridge circuit, series-isolating resistor 69, potentiometer 70 and to the source of voltage 71 that has a common ground connection with the source of voltage 66. The input conductor 72 and the output conductor 73 are connected to opposite points of the diagonal of the bridge that is balanced relative to the diagonal that is connected to the sources of voltage 66 and 61. The bridge limits the output voltage of positive polarity to a voltage no greater than that applied between the arm of potentiometer 67 and ground and a voltage of negative polarity to a voltage no greater than that applied between the arm of potentiometer 70 and ground. This simple type of limiter has been found to operate effectively in the circuits of FIGURES 1–3. Other types of limiters, combined with amplifiers when reqired, may also be used as limiters in the aircraft guidance circuits described herein.

Previously, aircraft navigational guidance systems have operated satisfactorily and safely when the correction in course required for entering a guidance beam is small. Since these systems for aircraft incorporated negative feedback circuits, the aircraft were piloted manually or automatically for entering the guidance beam gradually to prevent oscillation of the aircraft about the beam. However, when a major correction is required such as when an aircraft first intercepts a beam, a pilot of the aircraft has formerly had to refer to other instruments such as to pitch or to angle-of-attack indicators for determining hte attitude of the aircraft, or to bank indicators or to normal accelerometers for indicating the acceleration of the aircraft. A smooth instrument approach landing is accomplished more easily and more safely as the number of instruments that must be observed by a pilot are reduced in number. Through the applications of the limiter systems, as described herein, the limits of unsafe flying are automatically applied to correct the input voltages to either visual indicators or to automatic pilot systems for determining safe flight paths for aircraft that are flying on beams of radiant energy.

Although this invention has been described with respect to particular embodiments, it is understood that the limiting circuits described herein may be applied to other navigational circuits in ways obvious to those skilled in the art and still be within the scope and spirit of the following claims.

What is claimed is:

1. In a flight control system for an aircraft, a limiting circuit, first and second sensing means responsive to different flight information for developing first and second control voltages respectively, guidance means operative to different positions in response to the application of different voltages thereto, means responsive to said second sensing means for developing a balancing voltage, means for combining said first control voltage and said balancing voltage into a voltage of mean value and for applying said mean voltage to the input of said limiting circuit, the mean voltage applied to the input of said limiter normally being less than a predetermined voltage at which said limiter becomes effective in limiting, means for combining the output voltage of said limiting circuit and said second control voltage into a voltage of mean value and for applying said last mean voltage to said guidance means, said balancing voltage normally neutralizing said second control voltage to prevent said second control voltage from affecting the operation of said guidance means, and said limiting circuit in response to its input voltage exceeding said predetermined voltage limiting said balancing voltage so that said second voltage becomes effective in controlling said guidance means.

2. In a flight control system for an aircraft having first and second sensors, a first sensor developing a first control voltage having a sense corresponding to the direction of departure of said aircraft from a desired flight path and having an amplitude varying directly with the extent of the departure, a second sensor for developing a second control voltage in response to change of course of said aircraft in the direction of said departure, the sense of said second control voltage being opposite to that of said first control voltage during a change in course in the direction required for entering said desired path, a guidance means; a limiter for at times limiting said first control voltage for applying said second control voltage to said guidance means, a source of balancing voltage controlled by said second sensor for developing voltage opposite in sense to said second voltage, means for coupling said first sensor and said source of balancing voltage to the input of said limiter, said means applying a voltage that is the mean of said first control voltage and said balancing voltage to the input of said limiter, means for coupling the output of said limiter and said second sensor to said guidance means, said last means applying a voltage that is the mean of said second control voltage and the output voltage of said limiter to said guidance means, said limiter normally operating at input voltages less than a predetermined maximum unlimited voltage for passing said first control voltage to said guidance means, said balancing voltage normally neutralizing said second control voltage, and said limiter becoming effective to limit its output voltage in response to its input voltage becoming higher than said predetermined maximum voltage so that said second control voltage is not neutralized by said balancing voltage and becomes effective in changing the voltage applied to said guidance means.

3. A limiting control system according to claim 2 including means for coupling high-passed voltage from said second sensor to the input of said limiter, said high-passed voltage normally being opposite in sense to said first control voltage.

4. In a glide-slope control system for an aircraft, a glide-slope receiver, a limiter, a first coupling resistor, the output of said glide-slope receiver being connected through said first resistor to the input of said limiter, a pitch-sensing device having first and second output circuits, a high-pass filter, a second coupling resistor, said first pitch output circuit being connected through said high-pass filter and said second pitch output circuit being connected through said second resistor to the input of said limiter, third and fourth coupling resistors, a guidance means, the output of said limiter being coupled through said third resistor and said first pitch output circuit being connected through said fourth resistor to said guidance means, said glide-slope receiver developing a voltage having a sense corresponding to the direction of departure of said aircraft from a glide-slope beam, said first pitch output circuit developing a voltage having a sense opposite to that in the output of said glide-slope receiver in response to said aircraft having the required pitch for entering said glide-slope beam, said second pitch output circuit developing a voltage of the same sense as that of the voltage developed by said glide-slope receiver, said limiter normally operating with input voltages less than a predetermined maximum voltage at which said limiter becomes effective in limiting, the voltage applied to the input of said limiter from said second pitch output circuit normally neutralizing that voltage applied from said first pitch output circuit to said guidance means, and said limiter operating to limit its output voltage in response to the output voltage of said glide-slope receiver exceeding said predetermined maximum voltage so that the voltage applied from said first pitch output circuit through said fourth resistor to said guidance means becomes effective in operating said guidance means.

5. In a glide-slope control system for an aircraft, a glide-slope receiver, a pitch sensor, an angle-of-attack sensor having first and second output circuits for developing voltages of opposite polarities, a normal-accelerometer sensor having first and second output circuits for developing voltages of opposite polarities, first and second limiters connected in cascade, means for coupling the output of said glide-slope receiver and said first angle-of-attack output circuit to the input of said first limiter and also high-pass filter means for coupling said pitch sensor to the input of said first limiter, means for coupling the output of said first limiter, said second angle-of-attack output circuit and said first normal-accelerometer output circuit to the input of said second limiter, a guidance means, means for coupling the output of said second limiter and said second normal-accelerometer output circuit to said guidance means, said first and second limiters normally receiving voltages less than the respective predetermined voltages at which said limiters become effective in limiting, the voltage applied from said first angle-of-attack output circuit to the input of said first limiter normally neutralizing the voltage applied from said second angle-of-attack output circuit to the input of said second limiter, the voltage applied from said first normal-accelerometer circuit to the input of said second limiter normally neutralizing that voltage applied to said guidance means from said second normal-accelerometer output circuit, and said limiters becoming effective to limit their respective output voltages in response to their respective input voltages exceeding their respective predetermined voltages, said second angle-of-attack output circuit applying voltage through said second limiter for operating said guidance means in response to the application of voltage greater than said respective predetermined voltage to the input of said first limiter and said second output circuit of said normal accelerometer becoming effective in operating said guidance means in response to the application of voltage greater than said respective predetermined voltage to the input of said second limiter.

6. In a localizer control system for an aircraft, a limiter, a band-pass filter, a localizer receiver, a bank sensor, a course-directional sensing system having first and second output circuits for developing respective voltages of opposite polarities, means for coupling the output of said localizer receiver, said bank sensor and said first output of said course-directional sensing system through said band-pass filter to the input of said limiter, means for coupling said second output circuit of said course-directional sensing system to the input of said limiter, a guidance means, means for coupling said bank sensor and the first output circuit of said course-directional sensing system and the output of said limiter to said guidance means, said limiter normally operating at voltages less than the predetermined voltage at which said limiter becomes effective in limiting, the voltage applied from said second output circuit of said course-directional sensing system to the input of said limiter normally neutralizing the voltage applied from said first output circuit of said course-directional sensing system to the guidance means, and said limiter becoming effective to limit its output voltage in response to its input voltage exceeding said predetermined voltage so that the voltage applied from said first output circuit of said course-directional sensing system to said guidance means is effective in operating said guidance means.

References Cited in the file of this patent

UNITED STATES PATENTS 2,808,999     Chenery  ---------------- Oct. 8, 1957